J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 1.
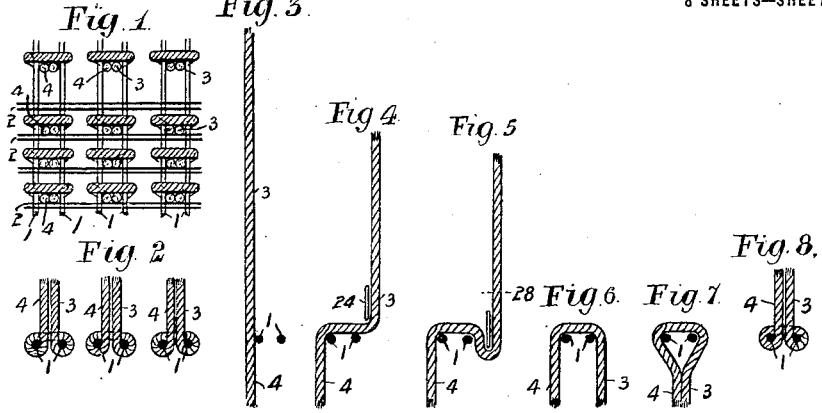
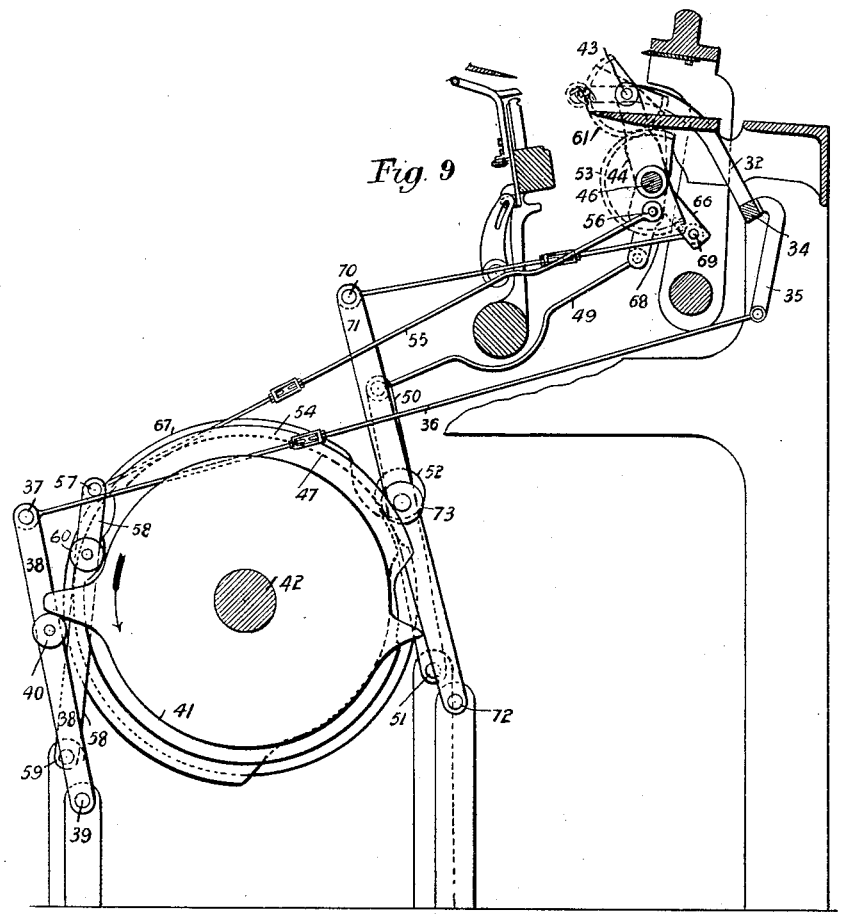
Witnesses
John C Sanders
Albert F Heaman
Inventor
John Ernest Grosvenor
By Wallace White
ATTY.

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 2.
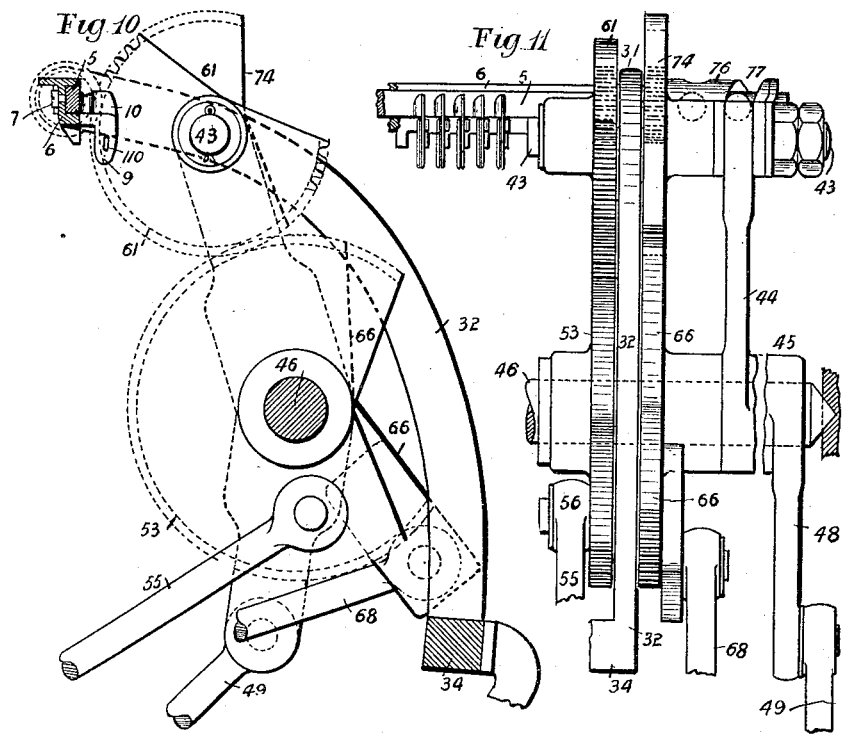
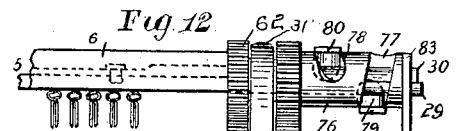
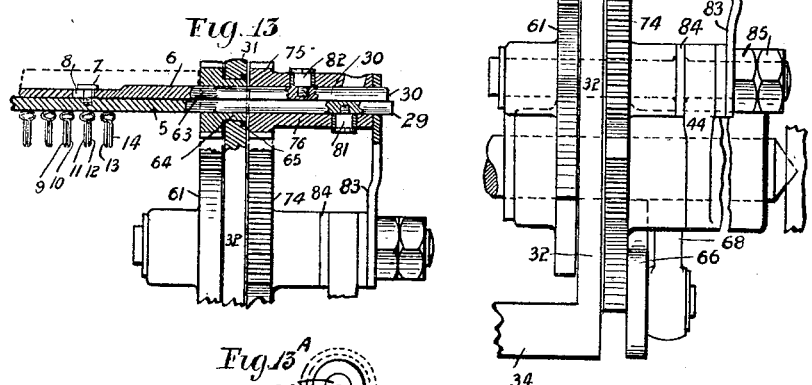

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 3.
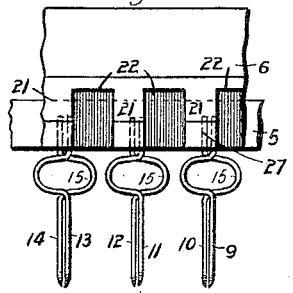
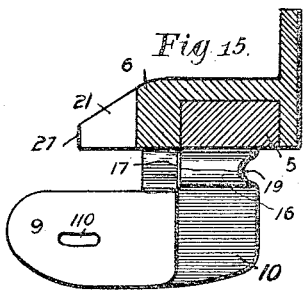
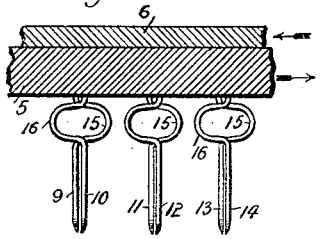
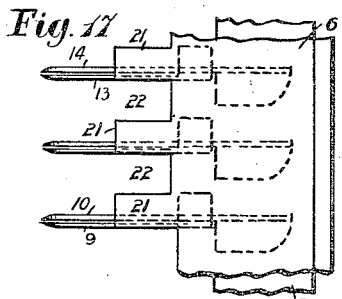
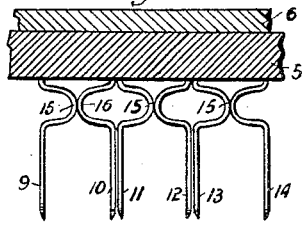
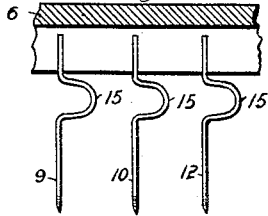
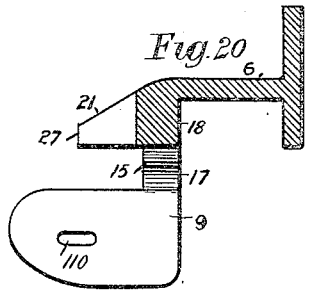
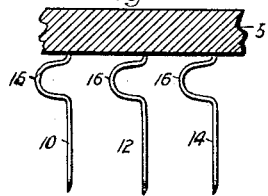
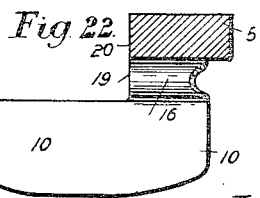

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 4.
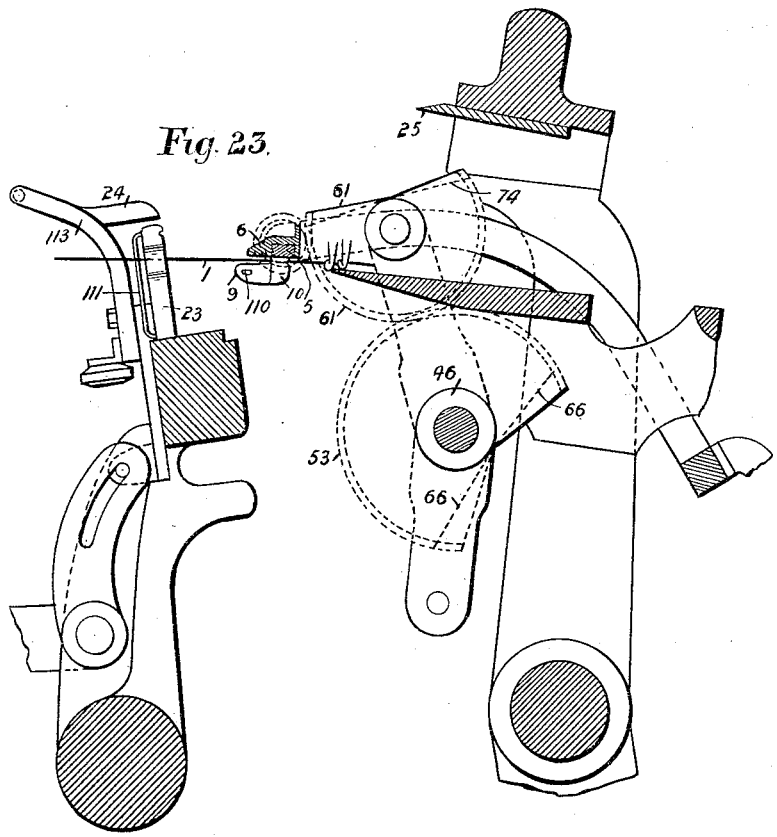
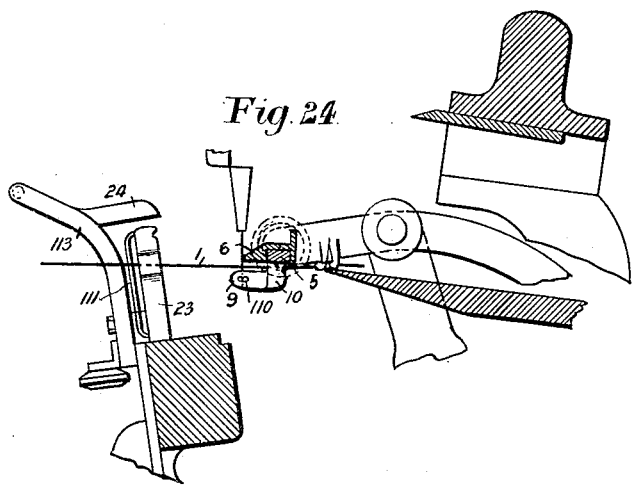
Witnesses
John C. Sanders
Albert F. Heuman
Inventor
John Ernest Grosvenor
BY Wm Wallace White
ATTY.

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 5.
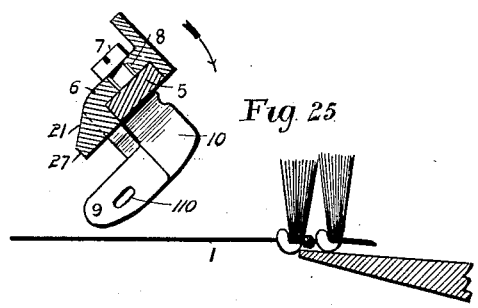
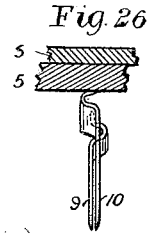
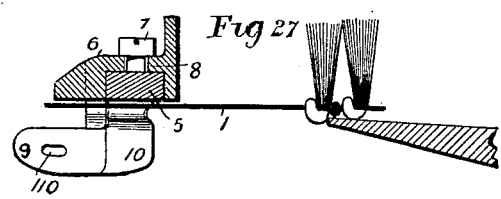
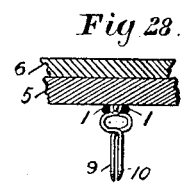
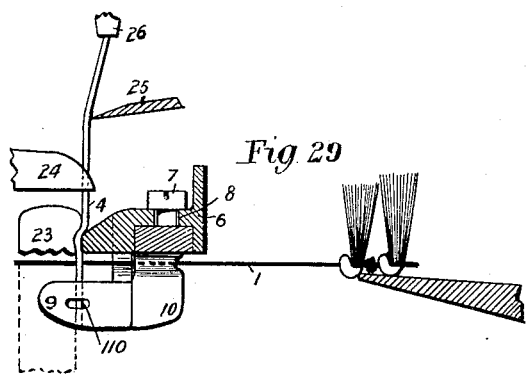
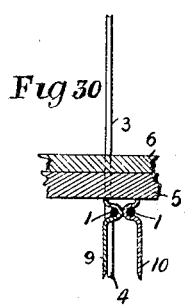
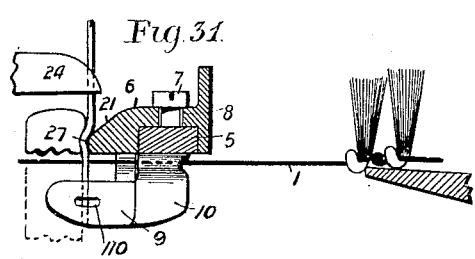
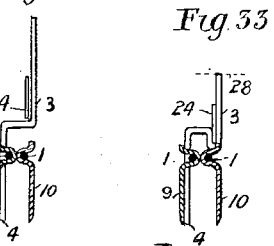

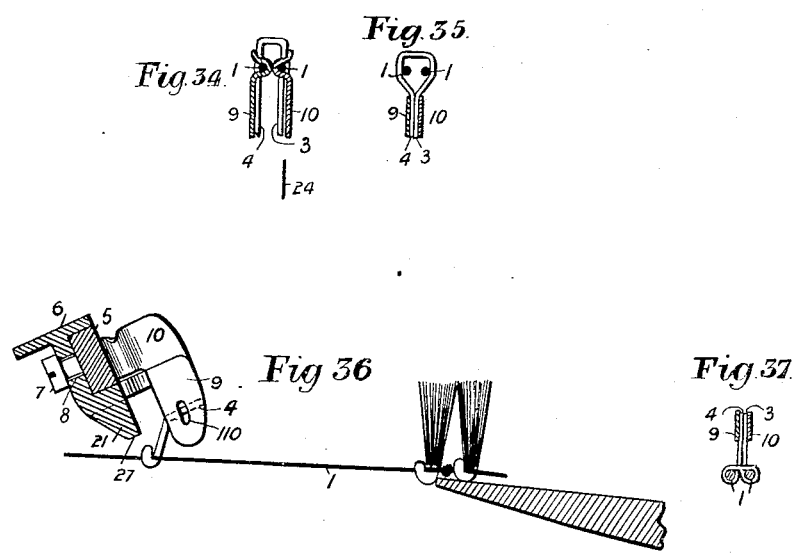
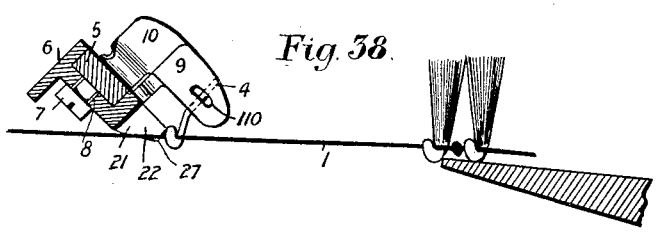
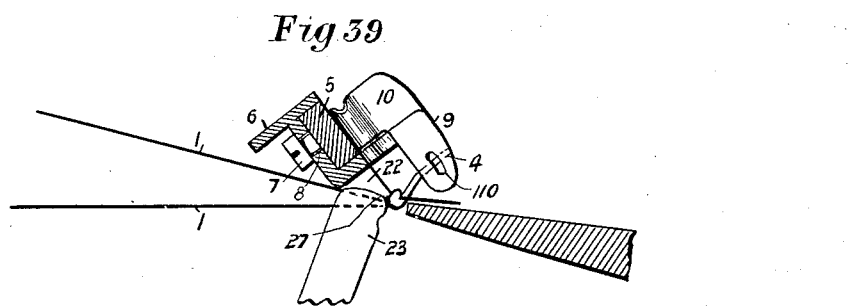

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 7.
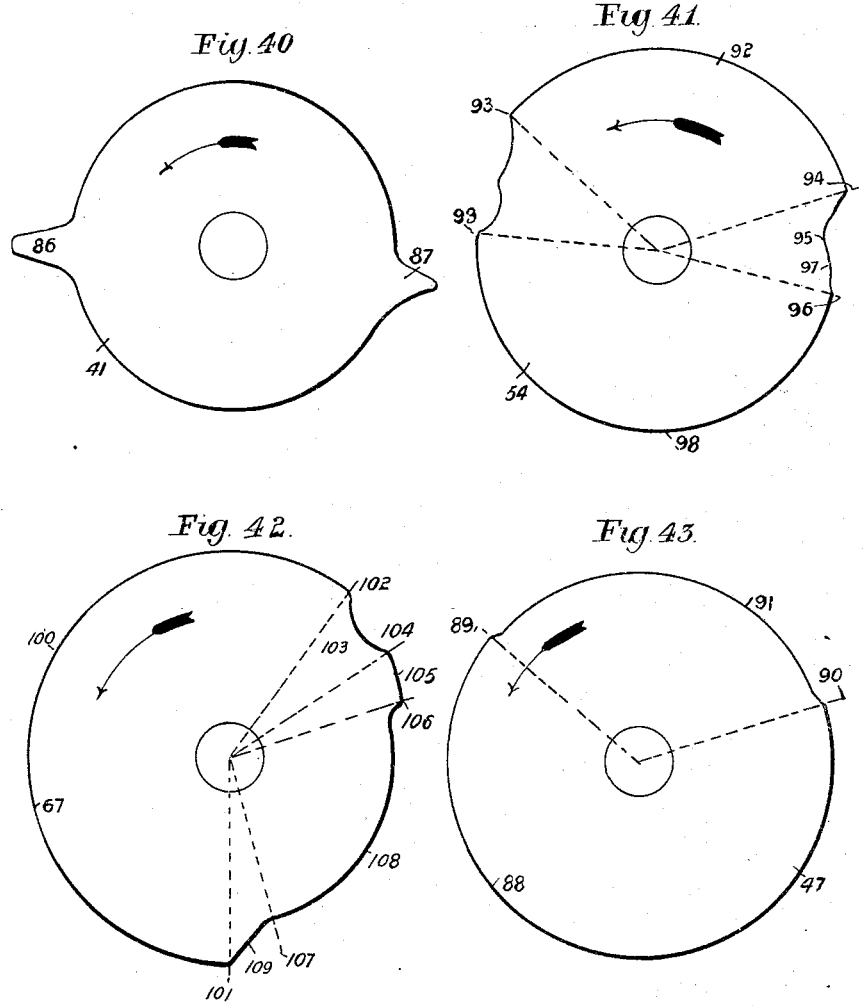

J. E. GROSVENOR.
LOOM FOR WEAVING TUFTED CARPETS AND OTHER TUFTED FABRICS.
APPLICATION FILED DEC. 31, 1912.
1,198,722.
Patented Sept. 19, 1916.
8 SHEETS—SHEET 8.
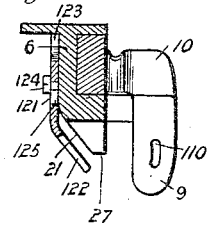
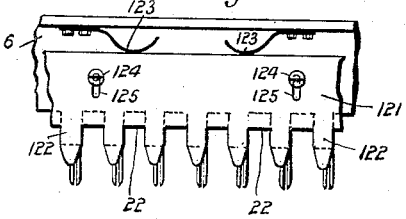
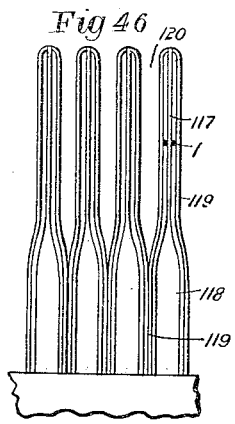
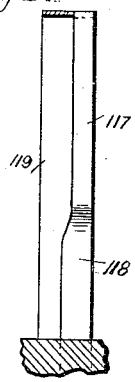
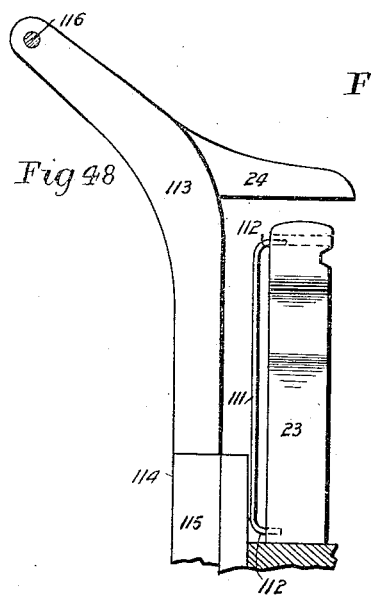
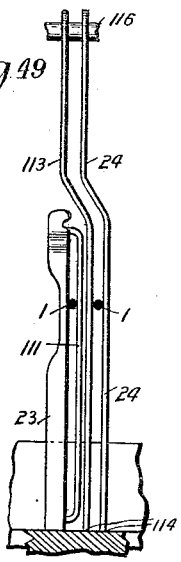

UNITED STATES PATENT OFFICE.

JOHN ERNEST GROSVENOR, OF WORCESTER CROSS, KIDDERMINSTER, ENGLAND.

LOOM FOR WEAVING TUFTED CARPETS AND OTHER TUFTED FABRICS.

1,198,722.      Specification of Letters Patent.      Patented Sept. 19, 1916.

Application filed December 31, 1912. Serial No. 739,442.

*To all whom it may concern:*

Be it known that I, JOHN ERNEST GROSVENOR, subject of His Majesty the King of Great Britain and Ireland, residing at Worcester Cross, Kidderminster, in the county of Worcester, England, carpet manufacturer, have invented new and useful Improvements in Looms for Weaving Tufted Carpets and other Tufted Fabrics, of which the following is a specification.

This invention has reference to power looms for weaving tufted carpets, rugs, and other tufted fabrics of those kinds in which the pile yarn has been introduced from without and is knotted in in the manner known as the Turkish or Giordes knot, each tuft embracing at least two warps and having the tuft ends passed up (or down) between the said warps, one or more shots of weft being employed between successive rows of tufts to make a proper bind.

My invention is directed to provide improved means and mechanism whereby the said knots forming a complete row of tufts as aforesaid are more perfectly and uniformly formed and secured in the fabric than heretofore.

One important feature of my invention is that the ends of the tufting yarns which are gripped and looped around the warps, forming the row of knots as aforesaid are by the grippers pulled tightly above (or below) the warps before and during the introduction of and beating up of a shot of weft to bind the tufts, thus insuring the greatest possible length of tuft projecting above the warps and forming a deeper pile than would be the case if the pile tufts were not pulled tightly around the warps while the shot of weft is being put in and beaten up as aforesaid. In combination with the means for gripping and pulling the ends of the tuft yarns as aforesaid means are or may be provided for moving the row of knots along the warps close up to the work immediately before the tufts are pulled tightly and the shot of weft is beaten up to bind the tufts as aforesaid.

My said invention also comprises as hereinafter described various other improvements in the mechanism which form or assist in forming the rows of tuft knots as aforesaid.

My said invention can be carried out on what is known as a royal Axminster loom or on any other loom in which the tufting yarns are inserted from without, and can be arranged to weave the fabric either face downward or face upward, and in the forming of the knots the ends of the tufts can be turned through the warps either away from the work or toward the work, but the latter is what I prefer and with the fabric woven face upward, because in this case when the row of tufts has been beaten up the upwardly projecting ends of the tufts between the warps are held in position and supported by being between the finished work and the portions of the tuft yarns which cross and embrace the warps.

The mechanism for carrying out my invention can be arranged in various ways, but what I prefer is the arrangement hereinafter described which has a series of grippers adapted to grip the ends of the tufts below the warps and which are carried above the warps and are so constructed, arranged and operated that they grip and turn up the ends of a row of tufts toward the completed work and assisted by another part of the mechanism draw the knots along the warps, up to the completed work the grippers then pulling the knots tightly around the warps while they are bound in by the weft, thus insuring as aforesaid, the maximum length of tufts and all the knots being perfectly formed and secured in the fabric.

My invention and the preferred arrangement of mechanism for carrying it into practice are illustrated by the accompanying drawings which show my invention as applied to a well known Axminster loom and with the fabric woven face upward but it will be understood that if preferred the fabric can by suitably modifying the mechanism be woven face downward.

Figure 1 is a plan of a piece of tufted fabric of the kind produced by my invention; Fig. 2 is a cross sectional elevation of the same but with the wefts omitted; Figs. 3, 4, 5, 6, 7, and 8 illustrate progressive stages in the insertion and knotting in of a pile tuft around two warps of the said fabric; Fig. 9 is a cross sectional side elevation of some parts of an Axminster loom with my invention applied thereto; Fig. 10 is a side elevation partly in section of the compound gripper bar and grippers and some of the operating mechanism of the same; Fig. 11 is a front elevation partly in section of the parts shown in Fig. 10; Fig. 12 is a plan of one end of the compound gripper bar and a portion of its operating mechanism; Fig. 13 is a sectional plan of some of the parts shown in Fig. 12; Fig. 13ª is an end view of the upper part of Fig. 13; Fig. 14 is a back elevation of a portion of the said compound gripper bar and grippers; Fig. 15 is a cross sectional side elevation of the same; Fig. 16 is a front sectional elevation of the same; Fig. 17 is a plan of the same; Fig. 18 is a front sectional elevation of the same showing the grippers open, whereas in Fig. 16 they are closed; Fig. 19 is a cross sectional front elevation of a portion of one of the sliding bar parts and some of the gripper blades of the compound gripper bar; Fig. 20 is a cross sectional side elevation of the same; Fig. 21 is a front sectional elevation of a portion of the other sliding bar and gripper blades of the compound gripper bar; Fig. 22 is a cross sectional side elevation of the same; Fig. 23 is a side sectional elevation of some of the portions of the loom shown in Fig. 9, but drawn on a larger scale; Fig. 24 is also a cross sectional side elevation of some of the parts shown in Fig. 23 so as to illustrate their action; Figs. 25 to 39 are a series of views illustrating the operation of the grippers and those other parts which form the rows of tufts into Turkish or Giordes knots and move them up into position against the completed work; Fig. 40 is a front elevation of the rising and falling cam; Fig. 41 is a front elevation of the turning cam; Fig. 42 is a front elevation of the opening and closing cam; Fig. 43 is a front elevation of the rocking cam; Fig. 44 is an end sectional elevation of the gripper bar and grippers furnished with a comb plate for assisting in opening the pairs of warps for the insertion of the grippers; Fig. 45 is an elevation looking toward the left hand side of Fig. 44; Fig. 46 is a front elevation of an alternative construction of slay for use with the said mechanism; Fig. 47 is a sectional side elevation of the said slay; Fig. 48 is a sectional side elevation of the slay furnished with a device to assist in opening the pairs of warps for the insertion of the grippers; and Fig. 49 is a front elevation of the arrangement shown in Fig. 48 looking toward the right hand side of that figure.

Referring firstly to Figs. 1 to 8 the two warps in each pair are marked 1, the wefts are marked 2, and the two upstanding end portions of each of the tufts are respectively marked 3 and 4. Speaking broadly the inserted tuft yarns in the formation of the knots pass through substantially the same sequence of operations as described and illustrated in my prior British specification No. 12312 of A. D. 1909 and as now shown in Figs. 3 to 8 which correspond with Figs. 3 to 8 of my said prior specification but as aforesaid the ends of the tufts after being turned up (or down) through the warps are by part of my present invention pulled tightly around the warps by grippers while they are bound in by the weft as aforesaid.

My said preferred arrangement of mechanism is as follows:—I provide above the warps a compound horizontal gripper bar consisting of two bars 5, 6, the bar 6 being trough shaped with the bar 5 mounted to slide therein said two bars being connected together as by flat headed screws 7, fixed on the bar 5 and working through longitudinal slots 8 in the bar 6 so that the bars are adapted to slide one on the other. This compound gripper bar 5, 6, is mounted at both ends in bearings as hereinafter described in which bearings the two said bars 5, 6, can turn and slide, the supporting means hereinafter described of such bearings being arranged to have combined up and down and backward and forward movements so as properly to operate the tuft grippers in tying the knots as hereinafter described. The construction of the said grippers will be well understood by referring to Figs. 14 to 21 inclusive and 25 to 34 inclusive, Figs. 14 to 21, showing a short portion of the compound gripper bar with three pairs of vertical gripper blades, the gripper blades forming one pair being marked respectively 9, 10, those forming the second pair being marked respectively, 11, 12, and those forming the third pair being marked respectively 13, 14. The pairs of gripper blades are fixed as hereinafter described to the compound gripper bar at regular intervals apart corresponding with the pitch of the tufts in the fabric. The gripper blades 9, 11, 13, are fixed to and project from the lower side of the sliding bar 6 while the blades 10, 12, 14, are fixed to and project from the lower side of the sliding bar 5. The pairs of gripper blades are shown closed in Figs. 14 and 16 and open in Fig. 18. The left hand gripper blades 9, 11, and 13, are each made with a narrow neck 15 which is bent outwardly on the right hand side into a kink or groove, and the right hand gripper blades 10, 12, and 14, are connected to the bar 5 by a narrow neck 16 and similarly bent into kinks or grooves but on the left hand side. The edges 17, of the necks 15 are flush with the side 18 of the groove in the bar 6, and the adjacent edges 19 of the necks 16 are flush with the side 20 of the bar 5 so that the grooved or kinked necks 16, 16, of the gripper blades can pass and repass each other in the opening and closing of the pairs of grippers as hereinafter described. The front edge of the upper bar 6 of the compound gripper bar is serrated forming a series of blunt teeth 21 and alternate gaps 22 projecting over the pairs of gripper blades see Fig. 17. The object of these kinks 15, 16, arranged as aforesaid is to enable the gripper blades forming the different pairs to open so far apart that either end of every tuft can be inserted outside each pair of warps but inside the corresponding pair of gripper blades to be gripped thereby on the closing of the gripper blades, although each pair of gripper blades has itself been passed through the center of the corresponding pair of warps. This is effected as follows:—When the compound gripper bar 5, 6, is about in the position shown in Figs. 25 and 26 the pairs of gripper blades are closed together as in these figures and in Figs. 14, 16, and 17, and as the gripper bar turns and moves forward in the direction indicated by the arrows in Fig. 25, the pairs of gripper blades pass down through the center of the corresponding pairs of warps 1 to the position shown in Figs. 27 and 28 so that the gripper blades and their kinks or grooved parts are as shown now below the warps 1. The bars 5, 6, now slide in opposite directions as indicated by the arrows in Fig. 16 so that the gripper blades open as in Figs. 30 and 18 to a greater distance apart than the width of the two warps through which they have passed which is permitted by the side kinks 15, 16, into which the warps now rest as in Figs. 29 and 30 and this permits of the end 14 of the yarn to form the tuft being inserted as shown in Fig. 30 outside the pairs of warps 1 but between the gripper blades 9, 10, forming a pair which has passed through those warps and also permitting of the other end of the yarn forming the tuft to be passed down as hereinafter described also outside this pair of warps but inside the pair of gripper blades 9, 10, which has passed between the same as shown in Fig. 34 and so that when the gripper blades in each pair close together at the proper time as hereinafter described they grip the ends 4, 3, of the tuft between them as in Fig. 35 and turn them up to form the knot, this action taking place all along a row.

The back of the kinks 15, 16, of the gripper blades 9, 10, are beveled off so as to avoid the kinks catching in the warps when the gripper bar is turning upwardly from the position shown in Fig. 27.

The gripper bar is so shaped and arranged that during its turning movement the blunt teeth 21 of the bar 6 go behind the horizontal or top portions of the knots (see Fig. 38) and assist in pushing the tufts which are held by the grippers toward the completed work where, as hereinafter described, the grippers hold the tufts tightly in position until they are bound in by the weft or wefts, and when this has been accomplished the grippers return to their normal position see Fig. 25 ready to operate on the next row of tufting yarns.

The said gripping mechanism operates in combination with the slay, one of the reed dents of which is shown in Figs. 29 and 39 and is marked 23 and there is also a series of deflectors 24 operating with the slay 23 and which take the place of the hooks described in my said prior specification and there marked 21 and which deflectors 24 are or may be operated by similar means to that described in my said prior specification for operating said hooks and said deflectors are adapted to move the tufting yarns laterally across the pair of warps as in Fig. 4 and to press them down for a time as in Fig. 5 until they are cut and then to carry them down outside their pairs of warps Fig. 6 and between the gripper blades as aforesaid to be gripped thereby. Moreover when my invention is applied to a royal Axminster loom as illustrated by my drawings or to any loom in which the tufts are inserted from without and before being inserted are not severed from the yarn, the gripping mechanism together with the slay and deflectors 24 operate in combination with the usual knives shown in Figs. 9, 23, 24, and 29. The front knife 25 not only assists in severing the portions of the inserted tufts from the yarns, but also as hereinafter described, assists in pushing the inserted yarns on to the deflectors 24 while they are held between the slay 23 and the gripper bar and the front of the blunt teeth 21 of the gripper bar 6 as hereinafter described and as shown in Fig. 23.

The sequence of operations for simultaneously forming and tying a row of knots according to my invention when worked with an Axminster loom of the well known kind in which the tufting yarns are carried by bobbins on endless chains above the work is as follows:—Assuming that the slay 23 is in its backward position and the pairs of grippers carried by the combined gripper bar 5, 6, are closed together (see Figs. 9, 10, 11, 12, and 13) ready to pass the center of the pairs of warps, and the bobbin carrying the tufting yarns is in the bobbin arms descending to the work, the compound gripper bar with the grippers closed as aforesaid turns through a certain angle as in Figs. 25, and 26 to the position shown in Figs. 23, 27, and 28, so that the various pairs of gripper blades will now be down through the center of the corresponding pairs of warps. The pairs of gripper blades, by the sliding of the two parts 5, 6, of the compound gripper bar, now open sidewise as in Fig. 30 so that the warps 1 are as aforesaid in the lateral kinks or grooves 15, 16, of the gripper blades and the lower portions of the gripper blades are as aforesaid outside these warp ends 1 so as to enable the bobbin tubes 26 to descend and insert the ends of the tufting yarns outside the corresponding pairs of warps, but inside the pairs of grippers as in Fig. 30. Now the slay 23 goes forward and as shown in Fig. 29 grips the inserted yarns 4 against the ends 27 of the blunt teeth 21 formed on the serrated front edge of the gripper bar 6. The front knife 25 for severing the tufts now moves forward slightly pushing the yarns 4 between the deflectors 24 which as hereinafter described are carried in a row by and at the back of the slay 23 and project in front of the slay, see Fig. 29. While the yarn ends are thus held as in Fig. 29 between the slay 23 and the gripper bar 6, the deflectors 24 are caused to move laterally across the corresponding pairs of warps and taking the yarns 4 with them as in Figs. 31 and 32 and taking the yarns with them move downwardly for a short distance as in Fig. 33 between the blunt teeth 21 of the gripper bar so that the portions of the yarns forming the tufts are thus prevented from escaping from beneath the deflectors when cut from the portions of the bobbins. Before the yarns 4 are thus cut the bobbin rises slightly drawing off the yarns for the next row of tufts, and now the back knife advances and acting with the front knife cuts off the tufts as at the line 28 Figs. 5 and 33 from the lengths of yarns on the bobbins. The deflectors 24 now move right down between the different pairs of warps pushing down the severed ends 3 of the yarns between the gripper blades as 9, 10, as in Fig. 34 the gripper blades 9, 10, having meanwhile remained open as aforesaid with their lower portions outside the warps as shown in this figure, so that each of the pairs of warps 1 is now embraced by a tufting yarn the ends 3, 4, of which project downwardly between the corresponding pairs of gripper blades 9, 10. Now the slay 23 goes back and as soon as the slay is clear of the gripper blades they close together as in Figs. 14, 16, 17, and 35 and grip the downwardly projecting ends 3, 4, of the tufts. The compound gripper bar 5, 6, with the tufts gripped between the grippers as in Fig. 35 now commences to move forward slightly and also to turn toward the work so that the ends of the yarn tufts 3, 4, gripped by the gripper blades are turned up in the center of each pair of warps as in Figs. 8 and 36 until the compound gripper bar with the grippers have made about three eighths of a revolution as in Fig. 38 when the blunt ends 27 of the teeth 21 of the gripper bar will act on the upper cross portions of the knots and help to push them along the warps up to the work as in Fig. 38. Now the shed opens and a weft 2 is inserted and is then beaten up by the slay 23, the gripper blades meanwhile holding the tufts and pulling them tightly on and around the warps 1. The gripper bar and grippers rise slightly as or before they open to release the tufts thereby finally tightening the knots on to the warps 1. A row of knots is now finished and the compound gripper bar 5, 6, with the grippers moves backward (namely from the work) slightly and turns in the direction indicated by the arrow in Fig. 25 so as to bring the grippers back into their original position shown in Fig. 9 ready for the next series of operations as above described.

Any number of extra wefts may be inserted between the row of tufts to bind them and make up the spaces between the rows.

By the tufts being turned up toward the work as above described and pressed thereagainst by the teeth of the gripper blades until and while the weft is being inserted, a tufted fabric is formed with the Turkish knots perfectly uniform and having even a better appearance than when knotted in by hand.

The mechanism for carrying and operating in the manner above described, the compound gripper bar 5, 6, and the grippers fixed thereon can conveniently be arranged as I will now describe and as is illustrated in Figs. 9 to 13 but it is to be understood that my invention is not limited to this particular arrangement. Both end portions of each of the bars, 5, 6, are semi-circular in cross section, see Figs. 12 and 13 where one of the semi-circular ends of the bar 5, is marked 29 while the semi-circular end portion of the bar 6 is marked 30 and these fit together as shown in these Figs. 12 and 13 so as together to form circular cross section ends which fit and slide in bearings at the upper ends 31 of two supporting levers 32, only one of which can be seen in my drawings, but it will be understood that there is a similar lever 32 at the other end of the compound gripper bar. These two levers 32 support the compound gripper bar and grippers and impart the necessary up and down movements thereto. The lower ends of these two supporting levers 32 are connected together by a cross bar 34 on which is fixed a downwardly depending lever 35 which by a connecting rod 36 is connected to the upper end 37 of a rocking lever 38 which turns on the fixed fulcrum pin 39 and is furnished with a roller 40 which is acted on by the cam 41 (shown separately in Fig. 40), and which is fixed on the main cam shaft 42 of the loom. This cam 41 is hereinafter referred to as the rising and falling cam. The two fulcrum pins 43, of these two supporting levers 32 are carried by and at the upper ends of two links 44, the lower ends 45 of which (see Fig. 11) are fixed to and turn with a rocking shaft 46 which is supported by suitable end bearings in the loom frame. This rocking shaft 46 is rocked by connections to a cam 47 shown separately by Fig. 43 which is fixed on the main cam shaft 42. These connections conveniently consist of a downwardly projecting lever 48 fixed on the rocking shaft 46 and the end of this lever is connected by a connecting rod 49 to the upper end of a lever 50, the lower end of which turns about a fixed fulcrum 51, this lever having a roller 52 to act against the cam 47. The proper turning movements of the compound gripper bar 5, 6, and the grippers fixed thereon at the proper times as above described are effected by a spur toothed quadrant 53 mounted to turn independently on the rocking shaft 46 and turned by connections to the cam 54 (shown separately on Fig. 41) fixed on the main cam shaft 42. These connections can conveniently consist of a connecting rod 55 which at one end 56 is jointed to the face of the toothed quadrant 53 and at the other 57 is jointed to the top end of a lever 58 which at its lower end turns about a stationary fulcrum pin 59 and is furnished with the roller 60 to be acted upon by the cam 54. This toothed quadrant 53 gears with the spur wheel 61 mounted on the fulcrum pin 43 of one of the said supporting levers 32, which wheel 61 gears with a toothed pinion 62 mounted on a square or other like part 63 of the compound rocking bar 5, 6, so as to turn the said compound rocking bar in its bearings as and for the purposes aforesaid. The eye of the pinion 62 is squared and forms the bearing for the square end 63 of the rocking bar, and a boss 64 on this pinion 62 turns freely in the eye of the supporting lever 32, said pinion being retained in this eye by the washer or collar 65 fixed on the other end of the boss 64. The other end of the compound rocking bar is or may be similarly supported.

In order to impart the proper sliding movements to the rocking bars 5, 6, of the compound gripper bar to open and close the pairs of gripper blades at the proper times as hereinbefore described, another toothed quadrant 66 is mounted to turn loosely on the said rocking shaft 46 and is turned by connections to the gripper opening and closing cam 67 shown separately by Fig. 42 and fixed on the cam shaft 42. These connections can conveniently consist of a connecting rod 68 which at one end 69 is mounted on the toothed quadrant 66 and at its other end 70 is jointed to the top end of a lever 71 which turns about a fixed fulcrum at its lower end 72, this lever having a roller 73 to be acted upon by the cam 67. This toothed quadrant 66 gears with a spur wheel 74 (Figs. 11 and 12) which is mounted to turn loosely on the fulcrum pin 43 of the supporting lever 32, and this spur wheel 74 gears with a spur pinion 75 made with a long boss 76 mounted to turn freely on the circular longitudinally divided end portion 29, 30 of the compound gripper bar. The boss 76 of this pinion 75 is prolonged as a sleeve and has two inclined cam like slots 77, 78 formed in it with which respectively engage two rollers, 79, 80, mounted on two projecting pins 81, 82, fixed respectively to the semi-circular end portions 29, 30, of the two bars 5, 6, forming the compound gripper bar. These cam like slots 77, 78, inclined to the right and left hands respectively are so shaped (see Figs. 12, 13,) that as the pinion 75 is turned to and fro at the proper times by the spur wheel 74 and corresponding toothed quadrant 66 the proper endwise sliding movements in opposite directions are imparted to the two bars 5, 6, of the compound gripper bar so as to open and close the gripper blades and to maintain them open or closed as is required in the hereinbefore described operations of the grippers. The pinion 75 is mounted to turn loosely on the semi-circular end portions 29, 30, of the compound gripper bar and said pinion is prevented from moving endwise in one direction by coming in contact with the face of the supporting lever 32 and in the other direction by coming into contact with the bearing bracket 83 which is fixed on the fulcrum pin 43 outside the lever 44. The fulcrum pin 43 is made with a collar 84 and is securely fixed in the eye of the lever 44 by the nuts 85 screwed on the end of said fulcrum pin 43.

I will now describe the construction of the four cams hereinbefore mentioned, namely the rising and falling cam 41, the rocking cam 47, the turning cam 54 and the opening and closing cam 67 and these are shown in their relative positions in Fig. 9. Of the rising and falling cam 41 (Fig. 40) the projecting part 86 acts to cause the compound gripper bar and grippers to rise just after the knot has been tied and the grippers released and immediately before the grippers turn as in Fig. 25 and move down into the work. The other projection 87 on this cam is for the purpose of momentarily raising the compound gripper bar and grippers while turning from the position shown in Fig. 31 to that shown in Fig. 38.

The rocking cam 47 (Fig. 43) which operates the links 44 carrying the fulcrum pin 43 of the rising and falling levers 32 and imparts the backward and forward movements to the compound rocking bar, has a high stationary part 88 extending from the line 89 to the line 90, Fig. 43, corresponding with the period during which the gripper bars and grippers are in their forward position as shown for instance in Figs. 27, 29, 31, 36, and 38, and has another low stationary part 91 corresponding with the period when the gripper bar and the grippers have moved back to the work as shown in Fig. 39.

The turning cam 54 (Fig. 41) which controls the turning of the compound gripper bar and grippers has a high stationary part 92 extending from the line 93 to the line 94 and corresponding with the period during which the gripper bar and grippers are stationary and turned down into the work, for instance as in Fig. 27 then from the line 94 there is a peculiarly formed gap part 95 terminating at 96 and which corresponds with the period during which the grippers are turned around and up from the position shown in Fig. 31 to that shown in Fig. 36 in tying the knot, then there is a slight drop 97 from Fig. 36 to Fig. 38 and then low period of rest 98 extending from the line 96 to the line 99 which corresponds with the period during which there is no turning movement on the gripper bar and grippers while the knot is being moved up from the position shown in Fig. 38 to the work as shown in Fig. 39 and while the shed is opening and the wefts are being inserted and beaten up by the slay.

The opening and closing cam 67 (see Fig. 42) which as aforesaid controls the movements of the pinion 75 and its sleeve 76 to impart the necessary endwise movements to the bars 5, 6, of the compound rocking bar to open and close the grippers, has a high stationary part 100 corresponding with the period during which the grippers are closed and extending from the line 101 to the line 102 then from this line 102 there is a gap 103 to the line 104 corresponding with the period during which the grippers open to release the knot, then at the termination of this gap 103 there is at the line 104 a slightly falling part 105 which again causes the grippers to go down through the warp ends as in Fig. 25 and this extends to the line 106 from which to the line 107 there is a low stationary part 108 where the grippers are opened as in Fig. 30 for the yarn to be inserted and carried over the warp ends and the other end of the yarn pushed down by the deflectors as in Fig. 34. Then from the line 107 to the line 101 there is a rising inclined part 109 causing the grippers to close on to the inserted ends of the yarn as in Fig. 35, the grippers remaining closed as aforesaid while the stationary part 101 of the cam is acting on the roller.

For every cam, suitable springs, not shown on my drawings, force the roller levers toward the cams so as to maintain the rollers in proper contact therewith.

One of the gripper blades of each pair, preferably those gripper blades which are fixed to the through section bar 6, is or may be, made with a slot 110 along the center (see Figs. 15 and 20) into which a portion of the side of the inserted tuft yarn spreads when gripped by the gripper blades thereby improving the hold of the blades on the tuft. Or if desired for the same purpose the adjacent faces of the pairs of gripper blades may be roughened or corrugated or otherwise formed to improve their grip. The outer edges of the gripper blades are by preference ground off or otherwise removed as shown in Figs. 14, 16, 17, 18, 19, and 21 so as to facilitate the insertion of the grippers between the warps.

It will be evident that if desired the gripper blades may as an alternative be formed of stout wires bent to the required shape and fixed to the gripper bars. It is however preferred for the gripper blades to be made by press tools from sheet steel and hardened and tempered and they can readily be fixed to the gripper bars as shown by being soft soldered into saw-cuts therein at regular intervals apart.

In order to keep the warps at the proper distances apart and insure one of the warps around which the knot has been formed being always close against the side of the slay so that the warps will be properly opened to allow of the grippers to go in between them as aforesaid, the reed dents 23 of the slay are by preference each furnished with a stout upright wire 111 (see Figs. 23, 24, and 48) fixed at the back of the reed dent and parallel therewith and at a short distance from the back and somewhat to one side as in Figs. 48 and 49, which can readily be done by the bent ends 112 of the wire 111 being soldered in two holes drilled in the back of the reed. One of the warps passes between the side of the reed dent 23 and the inner side of the wire 111 as in Fig. 49. The other warp 1 of each pair is threaded between the corresponding deflector 24 and a guide 113 fixed parallel to the upright stem of the deflector. It will be understood that the lower ends 114 of the deflectors and guides are soldered in saw-cuts in a parallel sliding bar 115 carried at the back of the slay as aforesaid, and their upper ends are kept at the proper distances apart by a horizontal wire 116 which is threaded through a hole in each of them and to which they are soldered with distance washers between the various deflectors 24 and guides 113.

An alternative construction of slay is shown in Figs. 46 and 47 and this has thin upright blades 117 projecting upwardly between the two warps 1, the lower parts of these blades 117 being at 118 of the proper thickness to keep the two warps in a pair at the proper distance apart. These thick portions 118 at their upper parts gradually taper into the thin blades 117. Between these thick portions 118 of the various blades there are pairs of thin members 119 which above the thick portions 118 come so close to the upright blades 117 as just to leave sufficient space for the warps 1 to work in and thus form a gap 120 between each pair of these members 119 for the deflectors 24 to move down. In this arrangement when the slay is in its backward position the two warps have the thick portions 118 of the blades between them and are thus separated at the proper distances apart for the insertion of the grippers, but when the slay beats up, the warps are, by their moving to the upper parts of the reeds where they only have the thin blades 117 between them, brought into their normal positions closer together.

When the alternative construction of slay (Figs. 46, 47) is not used but a slay such as shown in Figs. 48 and 49 is employed, then I prefer to employ the device shown in Figs. 44 and 45 to assist in opening the pairs of warps for the insertion of the grippers. This device consists of a comb like plate 121 extending all along the compound gripper bar and slidably fixed on what is the top side of the trough section bar 6 when the latter is in the position shown in Fig. 15 with the grippers down in the work. This comb plate 121 is made with blunt pointed teeth 122 at the same distance apart as are the pairs of warps and these teeth are bent as in Fig. 44 so as to project over the blunt teeth 21 of the gripper bar 6 so that immediately after the noses of the gripper blades have entered between the warps the teeth 122 of the comb will enter and open the warps to permit of the blunt teeth 21 entering.

When the tufts are being beaten up by the slay the comb plate 121 is by the slay caused to slide backwardly on the gripper bar 6, but when the slay moves backwardly the comb plate 121 is by the springs 123 caused to move forward again to its normal position shown in Figs. 44 and 45. The comb plate 121 can be slidably connected to the gripper bar 6 by headed screws 124 at intervals passing through cross slots 125 into the gripper bar 6, these cross slots 125 permitting of the necessary sliding movements as aforesaid of the plate 121 on the gripper bars 6.

When the fabric is woven with the pile projecting underneath the warps then the gripper bar and grippers must also be arranged underneath and the said gripper bar and grippers and the slay and deflectors and certain other parts must be modified to suit as will readily be understood, but the preferred arrangement is that hereinbefore described and illustrated where the compound gripper bar and its grippers are arranged above the warps to weave the fabric with the tufts projecting above the warps as aforesaid.

The accompanying drawings illustrate what I consider to be the best way of carrying my invention into practice, but it is to be understood that my invention is not limited to the precise details shown as these can be varied to some extent without departing from the nature of my invention.

It will be understood from the foregoing description of my invention that when adapting this invention to an Axminster loom as aforesaid, it is necessary to increase the space between the edge of the front plate of the loom and the line at which the tuft yarns are inserted. This can readily be accomplished by reducing the front plate or by moving it back farther from the bobbin arms; or all the machinery of the loom can be moved forward say for two or three inches farther from the front plate.

What I claim as my invention and desire to secure by Letters Patent is:—

1. In a loom for weaving tufted fabrics of the kinds specified, the combination with a compound gripper bar mounted on the pile side of the warps of gripper blades fixed respectively to the two bars of the gripper bar furnished with external kinks for the warps and adapted to pass through the center of each pair of warps, means for opening the gripper blades on the other side of the warps to a greater distance than the width of the warps, means for inserting the ends of the tufting yarns outside the warps and between the gripper blades, means for opening and closing the gripper blades at the proper times, and means for turning and operating the compound gripper bar and gripper blades so as to form a complete row of Turkish knots, substantially as set forth.

2. In a loom for weaving pile fabrics of the kinds specified, the combination with the compound gripper bar mounted on the pile side of the warps of gripper blades fixed respectively to the two bars of the gripper bar furnished with external side kinks for the warps and adapted to pass through the center of each pair of warps, means for opening the gripper blades on the other side of the warps to a greater distance than the width of the warps, means for inserting the ends of the tufting yarns outside the warps and between the gripper blades, means for opening and closing the gripper blades at the proper times, and means for turning and operating the compound gripper bar and gripper blades so as to form a complete row of Turkish knots, blunt teeth carried by the gripper bar and adapted to operate with a slay to hold the yarns near the warps while the yarns are being deflected and turned between the warps, and means for moving the gripper bar so that the blunt teeth will push the knots along the warps up to the work, substantially as set forth.

3. In a loom for weaving pile fabrics of the kinds specified, the combination with the compound gripper bar mounted on the pile side of the warps of gripper blades fixed respectively to the two bars of the gripper bar furnished with external side kinks for the warps and adapted to pass through the center of each pair of warps, means for opening the gripper blades on the other side of the warps to a greater distance than the width of the warps, means for inserting the ends of the tufting yarns outside the warps and between the gripper blades, means for opening and closing the gripper blades at the proper times, and means for turning and operating the compound gripper bar and gripper blades so as to form a complete row of Turkish knots, said compound gripper bar having blunt teeth adapted to operate with a slay to hold the yarns near the warps while the yarns are being deflected and turned between the warps, means for moving the gripper bar so that the blunt teeth will push the knots along the warps up to the work, and a spring controlled inclined toothed bar slidably mounted on the gripper bar having its teeth matching those of the gripper bar, said teeth projecting in front of the teeth of the gripper bar so as to open the warps for the blunt teeth of the gripper bar said inclined toothed bar being adapted to move back when the slay is beating up the weft, substantially as set forth.

4. In a loom for weaving pile fabrics of the kinds specified, the combination with a compound gripper bar mounted on the pile side of the warps and made with gripper blades for gripping and forming the knots, teeth carried by the gripper bar, of a slay adapted to press the tufts against the teeth of the compound gripper bar and deflectors mounted above the slay and means for moving the deflectors so that they push the tufting yarns across the warps and down between and outside the warps, substantially as set forth.

5. In a loom for weaving pile fabrics of the kinds specified, the combination of a compound gripper bar mounted on the pile side of the warps having a plurality of cranked slotted gripper blades with warp receiving kinks, bobbin tubes feeding tufting yarns between the gripper bar and the slay, a knife for severing said yarns, a deflector for turning said yarns, said gripper blades operating to pass the tufting yarns between the warps to form a row of Turkish knots.

6. In a loom for weaving pile fabrics of the kinds specified, the combination of a compound gripper bar mounted on the pile side of the warps having a plurality of cranked slotted gripper blades with external kinks, bobbin tubes for feeding tufting yarns between the gripper bar and the slay, a knife for severing said yarns, a deflector for turning said yarns, said gripper blades operating to pass the tufting yarns between the warps to form a row of Turkish knots, each row of knots being moved along the warps up to the work by the operation of the gripper bar and slay.

7. In a loom for weaving pile fabrics of the kinds specified, the combination with a compound gripper bar mounted on the pile side of the warps and made with gripper blades for gripping and forming the knots, teeth carried by the gripper bar, of a slay having reed dents adapted to press the tufts against the teeth of the compound gripper bar and deflectors mounted above the slay, means for moving the deflectors so that they push the tufting yarns across the warps and down between and outside the warps, said slay having vertical wires fixed to the reed dents and adapted to keep the respective warps in contact therewith, substantially as set forth.

8. In a loom for weaving pile fabrics of the kinds specified, the combination with a compound gripper bar mounted on the pile side of the warps and made with gripper blades for gripping and forming the knots, teeth carried by the gripper bar, of a slay adapted to press the tufts against the teeth of the compound gripper bar and deflectors mounted above the slay, means for moving the deflectors so that they push the tufting yarns across the warps and down between and outside the warps, said deflectors having upright guide bars fixed alternately with the deflectors so as to keep the respective warps in contact therewith, substantially as set forth.

In testimony whereof I have signed my name to this specification in the presence of two subscribing witnesses.

JOHN ERNEST GROSVENOR.

Witnesses:
CHARLES BOSWORTH KETLEY,
BERTHA MATILDA DEELEY.

Copies of this patent may be obtained for five cents each, by addressing the "Commissioner of Patents, Washington, D. C."